United States Patent [19]

Jones et al.

[11] Patent Number: 5,591,098
[45] Date of Patent: Jan. 7, 1997

[54] LOCKING DIFFERENTIAL

[75] Inventors: Peter R. Jones, The Basin; Norman F. McDonald, Wandin, both of Australia

[73] Assignee: ARB Corporation Limited, Croydon, Australia

[21] Appl. No.: 386,269

[22] Filed: Feb. 9, 1995

[51] Int. Cl.⁶ ............................................. F16H 48/20
[52] U.S. Cl. ............................ 475/231; 475/233; 475/237
[58] Field of Search ................................. 475/231, 233, 475/234, 237

[56] References Cited

U.S. PATENT DOCUMENTS

| | | | |
|---|---|---|---|
| 4,594,913 | 6/1986 | Opitz | 475/237 X |
| 4,759,232 | 7/1988 | Roberts | 74/710.5 |
| 4,955,853 | 9/1990 | Bausch | 475/231 X |
| 4,976,667 | 12/1990 | Goscenski | 475/234 X |
| 5,171,192 | 12/1992 | Schlosser et al. | 475/231 X |
| 5,350,340 | 9/1994 | Paul et al. | 475/231 X |

*Primary Examiner*—Charles A. Marmor
*Assistant Examiner*—Saul Rodriguez
*Attorney, Agent, or Firm*— Dilworth & Barrese

[57] ABSTRACT

A locking differential comprising a differential carrier1 housing a pair of bevel gears 2, 3 and at least one pinion gear 4 which meshes with the pair of bevel gears, a locking ring 6 positioned within the differential carrier1 between the carrier and one of the bevel gears and splined to the carrier 1 at 7 and 8, locking teeth 9 on the locking ring 6 and corresponding locking teeth 10 on the bevel gear 3, an annular cylinder 12 formed in the carrier 1 and receiving a piston 11 and seal 11 *a*, the piston 11 being integral with the locking ring whereby the charging of the cylinder 12 with compressed air causes the locking ring 6 to move into its locking position with the teeth 9 engaging the teeth 10 against the action of springs 13 to lock the differential. The locking ring is located within a shaped cover plate C which closes the differential carrier 1 and provides bearing support for the bevel gear 3.

21 Claims, 1 Drawing Sheet

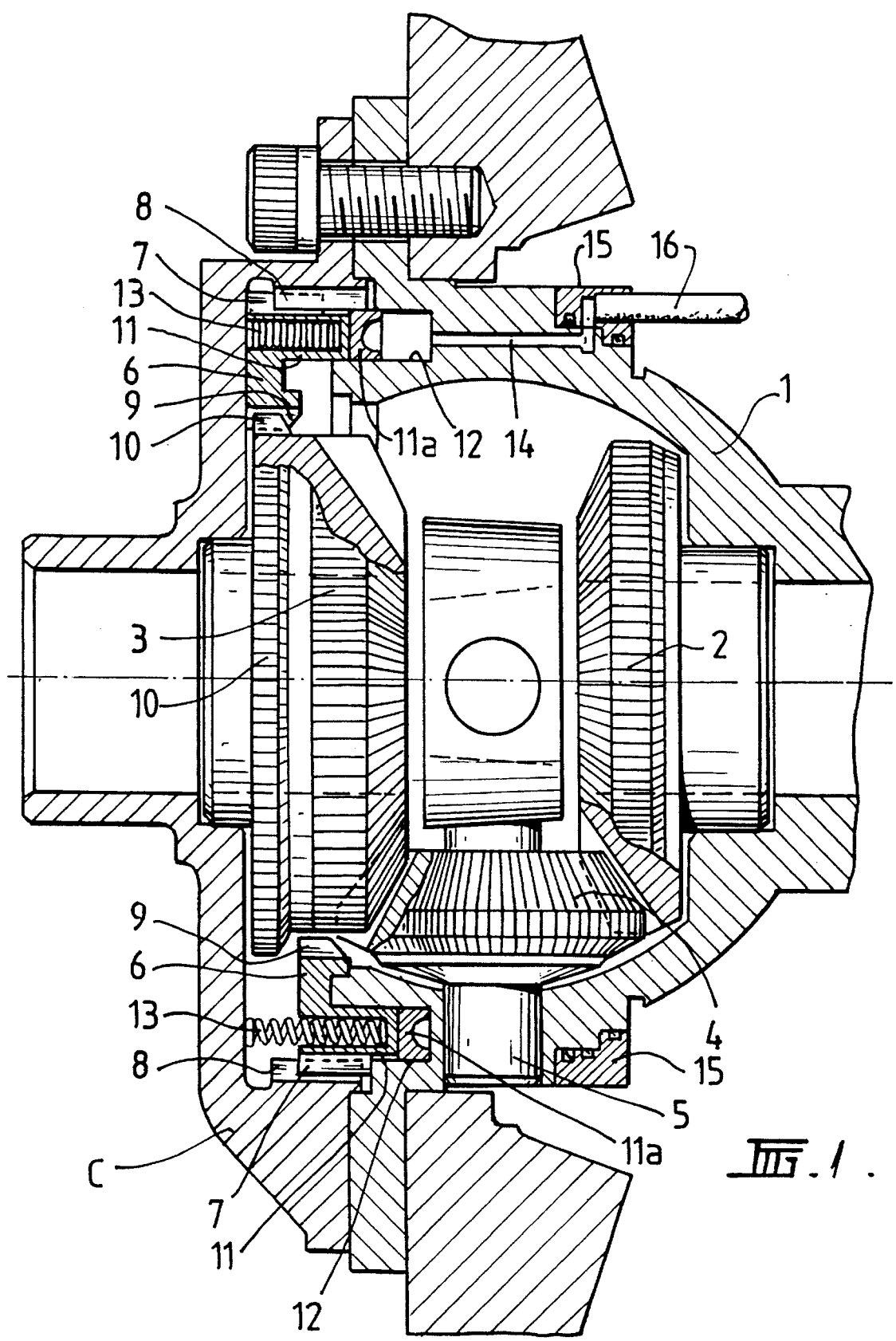

LOCKING DIFFERENTIAL

FIELD OF THE INVENTION

This invention relates to improvements in locking differentials.

BACKGROUND OF THE INVENTION

In our U.S. Pat. No. 4,759,232, Roberts, we have described an improved locking differential capable of remote pneumatic actuation and including a locking ring housed within the differential carrier around one of the bevel gears and connected to a piston actuator located around the other of the bevel gears and connected to the locking ring by a sleeve. This locking system has enjoyed significant commercial success since it provides a locking differential mechanism which can be fitted to an existing differential housing with minimal modification to allow the remote pneumatic operation.

As a result of the extremely confined space within the differential carrier, the actuator and locking ring have always needed to be located on opposite sides of the pinion gear which increases the manufacturing operations needed to produce the locking differential and increases the pads inventory by requiring a connecting sleeve between the locking ring and the actuator. This splitting of the locking mechanism has prevented the use of the same locking system on differentials of smaller dimensions since there is insufficient room between the other bevel gear and the differential carrier to house the actuator mechanism. Also, in some larger differentials the geometry of the differential carrier housing makes it impossible to locate a split locking mechanism of this type.

STATEMENT OF INVENTION AND OBJECTS

It is the object of the present invention to provide an improved differential locking system which enables a remotely operable fully enclosed locking mechanism to be located within a differential having smaller dimensions or inappropriate carrier geometry.

The invention therefore provides a locking differential comprising a differential carrier housing, a pair of bevel gears and at least one pinion gear which meshes with said pair of bevel gears, a locking means positioned within said differential carrier between said differential carrier and one of said bevel gears and keyed or splined to the carrier, said locking means including locking teeth or spline means, and said one of said bevel gears being formed with co-operating teeth or spline means, cylinder means formed in said differential carrier and housing an actuator positioned to cause movement of said locking means relative to said carrier whereby said locking teeth or spline means on said locking means engage said teeth or spline means on the one bevel gear to prevent rotation of the one bevel gear relative to said carrier to thereby lock said differential gear, said locking means and said cylinder means being positioned adjacent said one of said bevel gears with said locking means located within a cavity formed by a shaped cover plate forming part of said differential carrier and supporting said one of said bevel gears.

By providing a modified cover plate forming part of the differential carrier and shaped to house the locking means around the pinion gear supported by the cover plate, conversion to a locking differential is achieved in a simple and convenient manner which reduces the cost of the conversion and provides a particularly robust conversion for differentials of small dimensions.

The invention also provides a kit for converting a differential to a locking differential, said kit including a differential carrier within which a pair of bevel gears and at least one pinion gear are adapted to be supported, a locking means adapted to be keyed or splined to said differential carrier so as to be capable of axial movement relative to said carrier between said carrier and one of said bevel gears, said locking means including locking tooth or spline means, and a replacement bevel gear formed with tooth or spline means which are adapted to co-operate with said tooth or spline means associated with said locking means to prevent rotation of the one bevel gear relative to said carrier, said carrier being formed with a cylinder adapted to house an actuator for causing axial movement of said locking means relative to said carrier in use, said locking means and said cylinder means being positioned adjacent said one of said bevel gears with said locking means located within a cavity formed by a shaped cover plate forming part of said differential carrier and supporting said one of said bevel gears.

BRIEF DESCRIPTION OF THE DRAWING

One presently preferred embodiment of the invention will now be described with reference to the accompanying drawings showing a sectional elevation of a differential carrier incorporating a locking system embodying the present invention, in which.

DESCRIPTION OF PREFERRED EMBODIMENT

Figure 1:
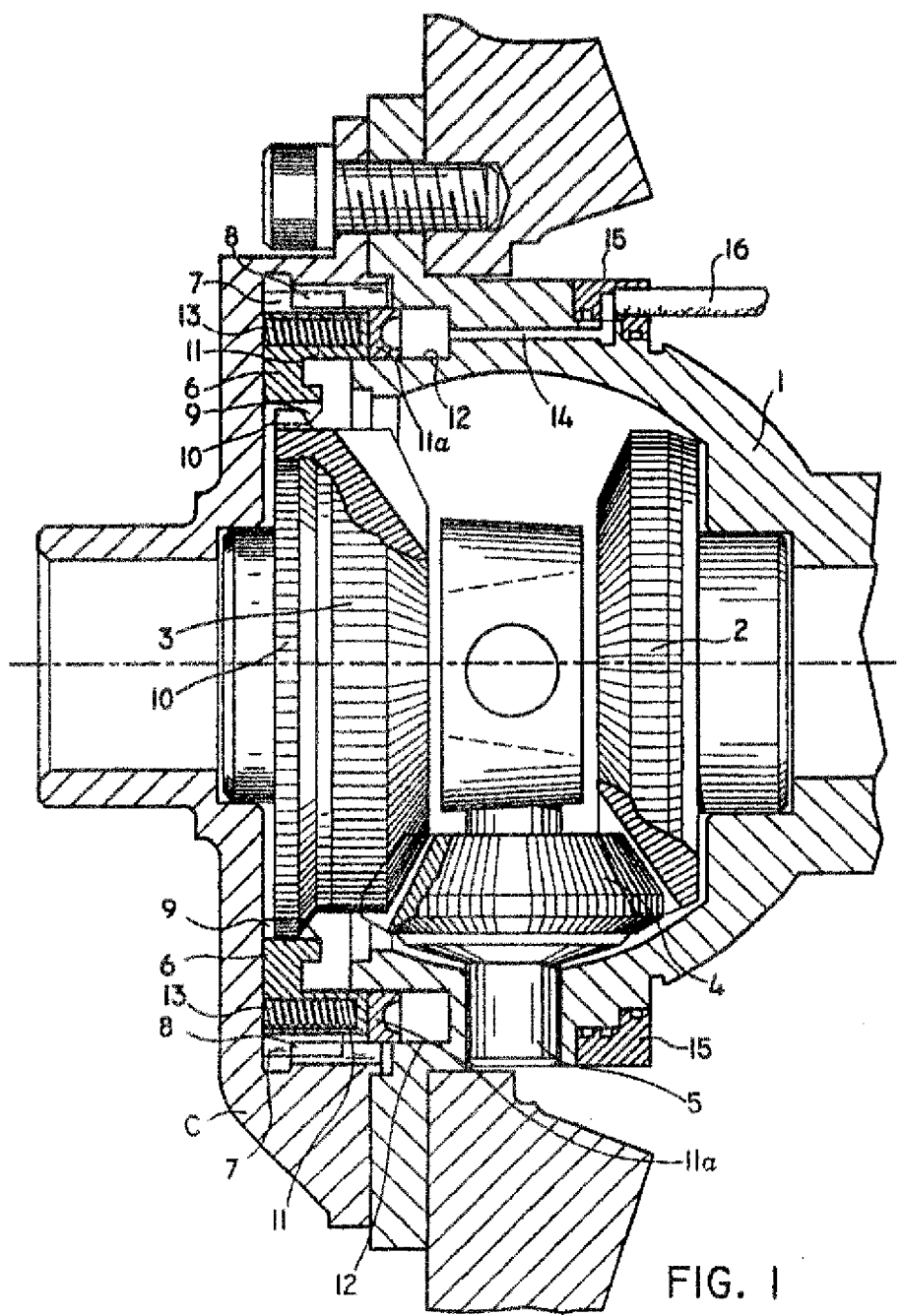
FIG. 1 is a sectional elevational view of the locking system of the present invention in engaged position.

Referring to the drawings, the differential carrier 1 rotatably supports a pair of bevel gears 2, 3 in the usual manner, as well as a pinion gear 4 which meshes with the bevel gears 2, 3 and is mounted for rotation on a shaft 5 supported by the carrier casing 1. The bevel gears 2, 3 are internally splined at 6 and 7 to receive the splined ends of half axles (not shown) in the usual manner.

The locking system embodying the present invention comprises a locking ring 6 formed with outwardly directed spline teeth 7 which engage mating spline teeth 8 formed in the differential carrier casing 1 surrounding the bevel gear 3 so that the locking ring 6 is axially slidable in the splines 8 relative to the carrier 1. The locking ring 6 is similarly formed with inwardly directed spline teeth 9 which are adapted to co-operate with locking teeth 10 formed around the periphery of the bevel gear 3.

Axial movement of the locking ring 6 is achieved by means of an annular piston 11, formed integrally with the locking ring 6, and an annular seal 11a, arranged in an annular cylinder 12 formed in the carrier casing 1 around the bevel gear 3. A series of springs 13 bias the locking ring 6 towards the disengaged position, shown in FIG. 2.

The piston 11 and seal 11a are actuated by means of compressed air, or some other suitable fluid under pressure, which is communicated to the cylinder 12 by means of a passage 14 formed in the carrier casing 1, and around the inlet opening to which an annular collar 15 is sealingly arranged. Compressed air is delivered by means of a pipe 16 which is connected to a fitting (not shown) on the axle casing (not shown).

Compressed air is delivered to the cylinder 12 via the pipe 16 and passage 14 by actuation of a valve suitably located in the driver's cabin of the vehicle to which the differential is fitted. The compressed air drives the piston 11 and seal 11a axially in the cylinder 12 and causes the locking ring 6 to move the spline teeth 9 into engagement with the teeth 10, as shown in FIG. 1, to thereby lock the bevel gear 3 against rotation. In this movement, the locking ring 6 is guided by the engagement between the spline teeth 7 and 8. When differential action is again required, the valve in the driver's cabin is returned to the de-activated position and the springs 13 return the piston 11 to the position shown in FIG. 2 whereby the spline teeth 9 on the locking ring 6 are disengaged from the locking teeth 10 on the bevel gear 3.

By locating the locking system around one of the bevel gears 3, only the cover plate C of the carrier housing 1 needs to be specifically modified in shape to receive the locking ring 6 and to provide the spline teeth 8. This simplifies the conversion and reduces the parts inventory required thereby reducing conversion costs.

While the above described embodiment of the invention is presently preferred, it should be appreciated that the specific form described is not essential to the invention. For example, the locking ring 6 may be replaced by a segment formed with spline teeth similar to 9 adapted to engage the teeth 10 on the bevel gear 3. Similarly, the piston 11 may be replaced by some form of mechanically or electrically operated actuator. For example, the locking ring or segment may form part of an electro-magnetic actuator to cause suitable locking of the bevel gear.

In the above described embodiment, the differential carrier casing 1 is adapted to be substituted for an existing differential carrier casing in a non-locking differential to thereby convert the differential into a locking differential. Of course, the differential casing may be substituted at the time of initial manufacture where a locking differential is required. Although substitution of the described differential casing is presently preferred, it may be possible where the structure of the differential casing is such as to facilitate conversion, to convert an existing non-locking differential casing to a locking differential casing by the addition of the locking system components described above.

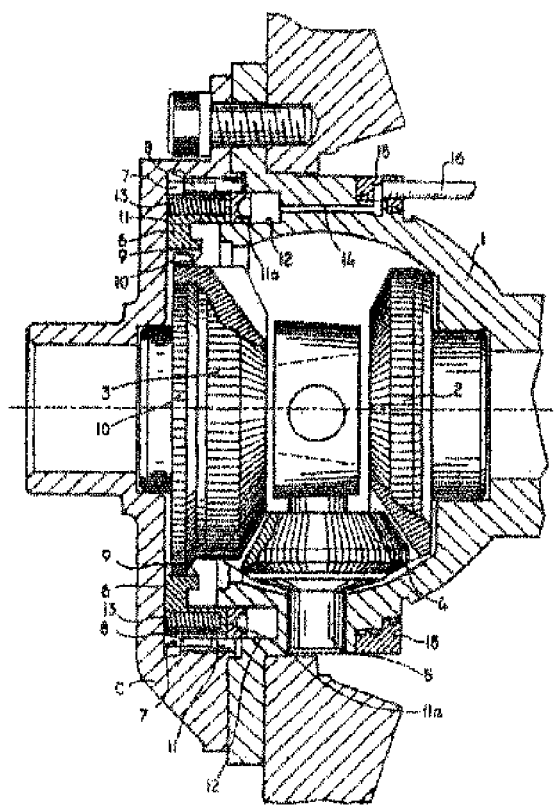

We claim:

1. A locking differential comprising
   a differential carrier housing a pair of bevel ears and at least one pinion gear which meshes with said pair of bevel gears,
   a locking means positioned within said differential carrier between said differential carrier and one of said bevel gears and keyed or splined to the carrier,
   said locking means including locking teeth or spline means,
   said one of said bevel gears being formed with co-operating teeth or spline means,
   cylinder means formed in said differential carrier and housing an actuator position to cause movement of said locking means relative to said carrier, whereby said locking teeth or spline means on said locking means engage said teeth or spline means on said one bevel gear to prevent rotation of said one bevel gear relative to said carrier to thereby lock said differential,
   said locking means and said cylinder means being positioned adjacent said one of said bevel gears, and
   a shaped cover plate forming part of said differential carrier and structured and arranged to support said one of said bevel gears,
   said cover plate comprising a cavity formed therein and in which said locking means is located,
   wherein said locking means is positioned on only one side of said pinion gear,
   said actuator and cylinder means are positioned on only one side of said pinion gear, and
   said locking means, actuator and cylinder means are all positioned on the same side of said pinion gear.

2. The locking differential of claim 1, wherein said locking means is positioned between said cover plate and said differential carrier.

3. The locking differential of claim 2 wherein said actuator includes piston means formed integrally with said locking means.

4. The locking differential of claim 3 wherein said actuator further includes a seal in said cylinder means and positioned to engage said piston means when actuated to cause locking movement of said locking means relative to said carrier.

5. The locking differential of claim 3, wherein said locking means includes a locking ring splined to said carrier and slidable axially to cause engagement between spline teeth on said locking ring and said locking teeth or spline means associated with said one of said bevel gears.

6. The locking differential of claim 4, wherein said piston means and said cylinder are annular and are arranged to surround said one of said bevel gears.

7. The locking differential according to claim 6 wherein passage means are provided in said carrier for charging said cylinder with compressed fluid under the control of remote valve means.

8. The locking differential of claim 4, wherein said locking means includes a locking ring splined to said carrier and slidable axially to cause engagement between spline teeth on said locking ring and said locking teeth or spline means associated with said one of said bevel gears.

9. The locking differential of claim 4, wherein said locking means comprises a locking ring formed with spline teeth, and
   said cover plate is provided with spline teeth arranged to engage mating spline teeth formed on said locking ring, such that said locking ring is axially slidable in said spline teeth relative to said carrier, and additionally comprising
   a series of springs being situated between said cover plate and locking ring and arranged to bias said locking ring towards a disengaged position, whereby said one bevel gear is free to rotate relative to said carrier.

10. The locking differential according to claim 1, further comprising spring means between said locking means and said cover plate operative to return said locking means to its inactive position.

11. The locking differential of claim 1, additionally comprising
   spring means for biasing said locking means towards a disengaged position, whereby said one bevel gear is free to rotate relative to said carrier.

12. The locking differential of claim 1, wherein a locking system including said locking means and actuator are located around said one of said bevel gears, and with only said cover plate being modified in shape to accommodate said locking means.

13. The locking differential of claim 12, wherein said locking means comprises a locking ring formed with spline teeth, and said cover plate is provided with spline teeth arranged to engage mating spline teeth formed on said locking ring, such that said locking ring is axially slidable in said spline teeth relative said carrier.

14. The locking differential of claim 12, wherein said cover plate is arranged to be bolted upon said differential carrier.

15. The locking differential of claim 9, where in said actuator includes piston means formed integrally with said locking ring, said actuator further including a seal in said cylinder means and positioned to engage said piston means when actuated to cause locking movement of said locking ring relative to said carrier.

16. The locking differential of claim 1, wherein said locking means includes a locking ring or segment forming part of an electro-magnetic actuator to cause suitable locking of said one bevel gear.

17. A kit for convening a differential to a locking differential, said kit including a differential carrier structured and arranged to support a pair of bevel gears and at least one pinion gear therein, a locking means structured and arranged to be keyed or splined to said differential carrier so as to be capable of axial movement relative to said carrier between said carrier and one of said bevel gears, said locking means including locking tooth or spline means, a replacement bevel gear formed with tooth or spline means which are structured and arranged to co-operate with said tooth or spline means associated with said locking means to prevent rotation of said one bevel gear relative to said carrier, said carrier being formed with cylinder means structured and arranged to house an actuator for causing axial movement of said locking means relative to said carrier in use, said locking means and said cylinder means being positioned adjacent said one of said bevel gears, and a shaped cover plate forming part of said differential carrier and structured and arranged to support said one of said bevel gears and comprising a cavity in which said locking means is arranged to be located, wherein said locking means is structured and arranged to be positioned on only one side of the pinion gear, said actuator and cylinder means are structured and arranged to be positioned on only one side of pinion gear, and said locking means, actuator and cylinder means are all structured and arranged to be positioned on the same side of the pinion gear.

18. The kit of claim 17, which comprises a locking system including said locking means and actuator being structured and arranged to be positioned around said one of said bevel gears, and with only said cover plate being modified in shape to accommodate said locking means.

19. The kit of claim 18, wherein said locking means comprises a locking ring formed with spline teeth, and said cover plate is provided with spline teeth arranged to engage the mating spline teeth formed on said locking ring, such that said locking ring is structured and arranged to be axially slidably positioned in the spline teeth relative to said carrier.

20. The kit of claim 18, wherein said cover plate is structured and arranged to be bolted upon said differential carrier.

21. The kit of claim 16, wherein said locking means is structured and arranged to be positioned between said cover plate and said carrier.

* * * * *

UNITED STATES PATENT AND TRADEMARK OFFICE
CERTIFICATE OF CORRECTION

| | |
|---|---|
| PATENT NO. | : 5,591,098 |
| APPLICATION NO. | : 08/386269 |
| DATED | : January 7, 1997 |
| INVENTOR(S) | : Peter R. Jones et al. |

It is certified that error appears in the above-identified patent and that said Letters Patent is hereby corrected as shown below:

The title page showing the illustrative figure should be deleted to be replaced with the attached title page.

The drawing sheet consisting of fig. 1, should be deleted to be replaced with the new drawing sheet of fig. 1, as shown on the title page that is attached.

Figure 2:
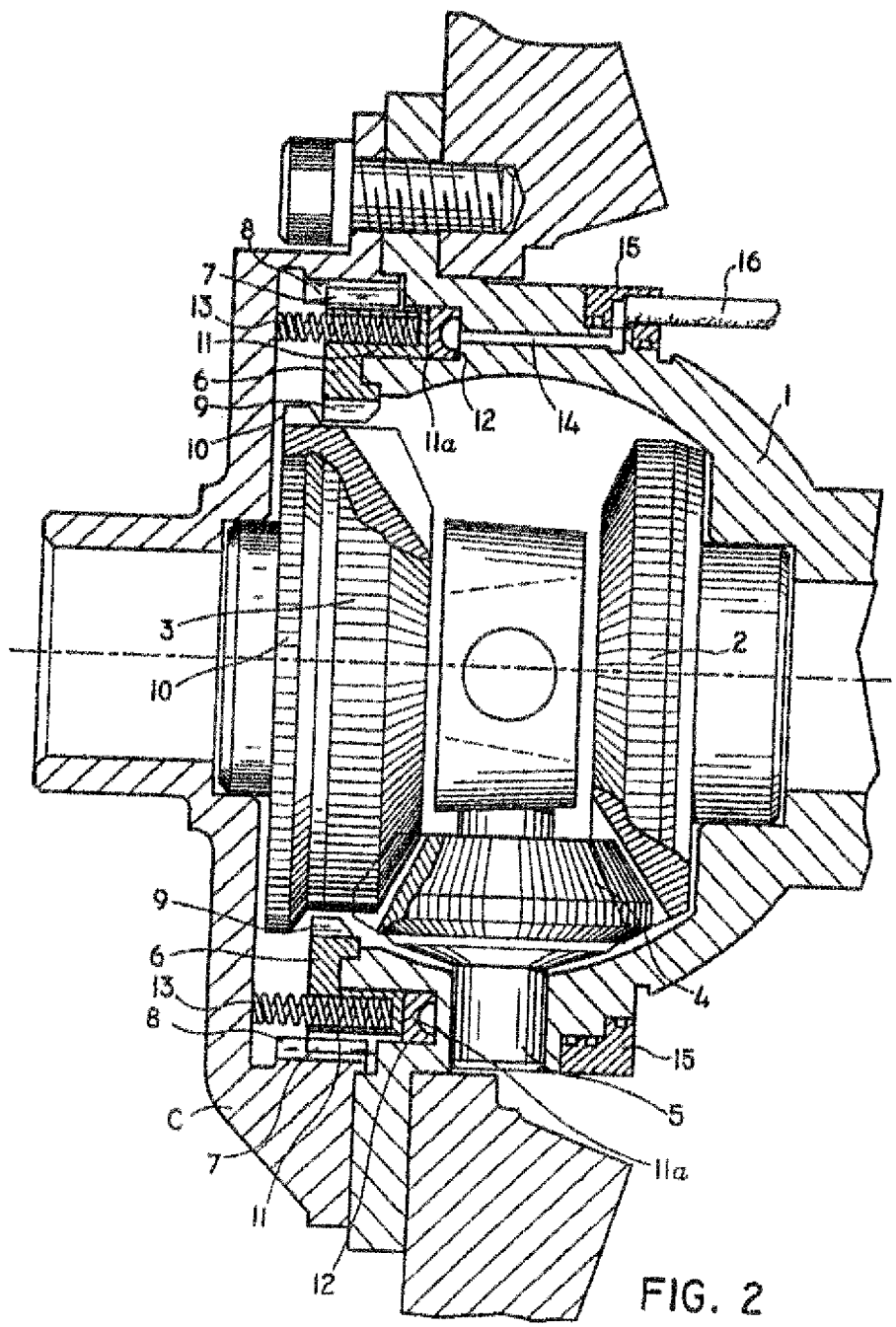
FIG. 2 is a sectional elevational view of the locking system in disengaged position.

Please delete the illustrative figure 2 and replace with the new fig. 2 that is illustrated on the attached page.

Column 3, line 45, replace the word "ears" with --gears--.

Signed and Sealed this

Eighth Day of December, 2009

David J. Kappos
*Director of the United States Patent and Trademark Office*

United States Patent
Jones et al.

[11] Patent Number: 5,591,098
[45] Date of Patent: Jan. 7, 1997

[54] LOCKING DIFFERENTIAL

[75] Inventors: Peter R. Jones, The Basin; Norman F. McDonald, Wandin, both of Australia

[73] Assignee: ARB Corporation Limited, Croydon, Australia

[21] Appl. No.: 386,269

[22] Filed: Feb. 9, 1995

[51] Int. Cl.⁶ ........................................ F16H 48/20
[52] U.S. Cl. ........................ 475/231; 475/233; 475/237
[58] Field of Search ............................. 475/231, 233, 475/234, 237

[56] References Cited

U.S. PATENT DOCUMENTS

| | | | |
|---|---|---|---|
| 4,594,913 | 6/1986 | Opitz | 475/237 X |
| 4,759,232 | 7/1988 | Roberts | 74/710.5 |
| 4,955,853 | 9/1990 | Bausch | 475/231 X |
| 4,976,667 | 12/1990 | Goscenski | 475/234 X |
| 5,171,192 | 12/1992 | Schlosser et al. | 475/231 X |
| 5,350,340 | 9/1994 | Paul et al. | 475/231 X |

Primary Examiner—Charles A. Marmor
Assistant Examiner—Saul Rodriguez
Attorney, Agent, or Firm—Dilworth & Barrese

[57] ABSTRACT

A locking differential comprising a differential carrier 1 housing a pair of bevel gears 2, 3 and at least one pinion gear 4 which meshes with the pair of bevel gears, a locking ring 6 positioned within the differential carrier 1 between the carrier and one of the bevel gears and splined to the carrier 1 at 7 and 8, locking teeth 9 on the locking ring 6 and corresponding locking teeth 10 on the bevel gear 3, an annular cylinder 12 formed in the carrier 1 and receiving a piston 11 and seal 11a, the piston 11 being integral with the locking ring whereby the charging of the cylinder 12 with compressed air causes the locking ring 6 to move into its locking position with the teeth 9 engaging the teeth 10 against the action of springs 13 to lock the differential. The locking ring is located within a shaped cover plate C which closes the differential carrier 1 and provides bearing support for the bevel gear 3.

21 Claims, 2 Drawing Sheet